(12) United States Patent
Seipold et al.

(10) Patent No.: US 10,948,063 B2
(45) Date of Patent: Mar. 16, 2021

(54) MODULAR ARRANGEMENT FOR HYDROMECHANICAL TRANSMISSION

(71) Applicant: Caterpillar Inc., Peoria, IL (US)

(72) Inventors: John Seipold, Peoria, IL (US); Stephen Marsh, Dudley (GB)

(73) Assignee: Caterpillar Inc., Peoria, IL (US)

( * ) Notice: Subject to any disclaimer, the term of this patent is extended or adjusted under 35 U.S.C. 154(b) by 260 days.

(21) Appl. No.: 15/911,531

(22) Filed: Mar. 5, 2018

(65) Prior Publication Data

US 2019/0271382 A1 Sep. 5, 2019

(51) Int. Cl.
  *F16H 47/04* (2006.01)
  *F16H 37/08* (2006.01)

(52) U.S. Cl.
  CPC ........... *F16H 47/04* (2013.01); *F16H 37/084* (2013.01); *F16H 2037/0886* (2013.01); *F16H 2047/045* (2013.01)

(58) Field of Classification Search
  CPC .. F16H 47/04; F16H 2047/045; F16H 37/084; F16H 2037/088; F16H 2037/0886
  See application file for complete search history.

(56) References Cited

U.S. PATENT DOCUMENTS

| | | | |
|---|---|---|---|
| 5,868,640 A | 2/1999 | Coutant | |
| 6,080,074 A * | 6/2000 | Ulbrich | F16H 47/04 475/72 |
| 7,530,913 B2 | 5/2009 | Fabry et al. | |
| 7,530,914 B2 | 5/2009 | Fabry et al. | |
| 7,670,260 B2 | 3/2010 | DeMarco | |
| 8,047,942 B2 * | 11/2011 | Ueda | F16H 47/04 475/79 |
| 9,488,263 B2 | 11/2016 | Vasudeva et al. | |
| 9,682,615 B2 * | 6/2017 | Kishimoto | B60K 6/387 |

* cited by examiner

*Primary Examiner* — Erin D Bishop
(74) *Attorney, Agent, or Firm* — Harrity & Harrity LLP

(57) ABSTRACT

A continuously variable transmission (CVT) may include differential and range modules that include planetary gear arrangements, a plurality of selectively engageable clutch assemblies, and a drop box module with a final output member. First and second power source paths may provide power to a same end of the differential module. The clutch assemblies may be selectively engageable to provide variable rotational power from the differential module to the range module, and from the range module to the drop box module in a plurality of directional ranges. The drop box module may adapt the variable rotational power provided in the selected range for connection in a given application.

20 Claims, 3 Drawing Sheets

MODULAR ARRANGEMENT FOR HYDROMECHANICAL TRANSMISSION

TECHNICAL FIELD

The present disclosure relates generally to continuously variable transmissions and, more particularly, to a modular gear arrangement for coupling gears in a hydromechanical transmission.

BACKGROUND

A continuously variable transmission (CVT) may refer to an automatic transmission that can change seamlessly through a continuous range of effective gear ratios, as opposed to other mechanical transmissions that offer a fixed number of gear ratios. By enabling an engine to operate at the engine's most efficient speed for a range of output speeds, engine loads, and/or the like, a CVT permits better performance and fuel efficiency. For example, when power is more important than economy, the gear ratio of the CVT can be changed to allow the engine to turn at a revolutions per minute (RPM) at which the engine produces greater power, which is typically higher than the RPM that achieves peak efficiency. Existing CVTs are typically designed as large and long structures in order to meet machine use and drop requirements, and are not typically able to be incorporated economically into smaller applications. Thus, such transmissions are generally utilized in only limited smaller applications.

One attempt to create a more compact CVT is disclosed in U.S. Pat. No. 9,488,263 that issued to Vasudeva on Nov. 8, 2016 ("the '263 patent"). In particular, the '263 patent discloses a CVT utilizing first and second power source paths to provide multiple outputs through a planetary gear arrangement and a final output member. Some implementations of a hydromechanical CVT design disclosed in the '263 patent have a first, differential module and a second, range module, each having planetary gear trains compactly mounted in series with the output transfer gear of a third, drop box module for selectively associating the output shaft of the drivetrain to the outputs of the planetary gear trains.

While the CVT of the '263 patent may have more compact packaging, and may allow the CVT to be packaged in smaller machines or locations with space limitations, the CVT of the '263 patent may not be compact enough for even smaller machines or more restrictive space limitations. The CVT of the present disclosure solves one or more of the problems set forth above and/or other problems in the art.

SUMMARY

In some implementations, the present disclosure is related to a transmission for coupling to a primary driver via a first power source path that includes a variator and a second power source path that includes at least one mechanical gear. The transmission may include a differential module that includes a first planetary gear arrangement having a first plurality of gears including a sun gear and a carrier, where the first power source path is to provide power to the sun gear and the second power source path is to provide power to the carrier, and where the power from the first power source path and the power from the second power source path are to be provided via a same end of the differential module. The transmission may include a range module that includes a second planetary gear arrangement having a second plurality of gears. The transmission may include a plurality of selectively engageable clutch assemblies that are selectively engageable to provide a plurality of directional ranges, where at least one clutch assembly, of the plurality of selectively engageable clutch assemblies, is selectively engageable to couple at least one gear from the first planetary gear arrangement with at least one gear from the second planetary gear arrangement. The transmission may include a drop box module that includes a final output member, where the differential module is coupleable to the range module to provide a variable rotational power to the range module, where the range module is coupleable to the drop box module to direct the variable rotational power in a selected direction, and where the variable rotational power, provided in the selected direction, is to be transmitted through the drop box module to the final output member.

In some implementations, the present disclosure is related to a transmission that includes a differential module, a range module, a first power source path that includes a variator, a second power source path that includes at least one mechanical gear, a plurality of clutch assemblies, and a drop box module. The differential module may include a first planetary gear arrangement that includes a first sun gear, a second sun gear, a first set of planet gears, a second set of planet gears, a first planet carrier, and a first ring gear. The range module may include a second planetary gear arrangement that includes a third sun gear, a fourth sun gear, a third set of planet gears, a fourth set of planet gears, a second planet carrier, and a second ring gear. The first power source path and the second power source path may provide power to the differential module without passing through the range module. The plurality of clutch assemblies may include at least a first clutch assembly and a second clutch assembly, where the first clutch assembly is selectively engageable to couple at least one gear of the first planetary gear arrangement and at least one gear of the second planetary gear arrangement, and where the second clutch assembly is selectively engageable to couple with at least one gear of the second planetary gear arrangement. The drop box module may include a final output member, where the differential module is coupleable to the range module to provide a variable rotational power to the range module, where the range module is coupleable to the drop box module to direct the variable rotational power in a selected range, and where the variable rotational power, in the selected range, is to be transmitted through the drop box module to the final output member.

In some implementations, the present disclosure is related to a machine that includes a transmission. The machine may include a first power source path that includes a variator, and a second power source path that includes at least one mechanical gear. The machine may include a differential module that includes a first planetary gear arrangement having a first plurality of gears including a sun gear and a carrier, where the first power source path is to provide power to the sun gear and the second power source path is to provide power to the carrier, where the power to the sun gear and the power to the carrier is to be provided from a same direction relative to the differential module. The machine may include a range module that includes a second planetary gear arrangement having a second plurality of gears. The machine may include a plurality of selectively engageable clutch assemblies that are selectively engageable to provide a plurality of directional ranges, where at least a first clutch assembly, of the plurality of selectively engageable clutch assemblies, is selectively engageable to couple at least one gear from the first planetary gear arrangement with at least one gear from the second planetary gear arrangement, and where at least a second clutch assembly, of the plurality of selectively engageable clutch assemblies, is selectively engageable to couple with at least one gear from the second planetary gear arrangement. The machine may include a drop box module that includes a final output member, where the differential module is coupleable to the range module to provide a variable rotational power to the range module, where the range module is coupleable to the drop box module to direct the variable rotational power in a selected direction, and where the variable rotational power, provided in the selected direction, is to be transmitted through the drop box module to the final output member.

DETAILED DESCRIPTION

This disclosure relates to a CVT. The CVT has universal applicability to any machine utilizing such a CVT. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine and driven from the CVT.

Figure 1:
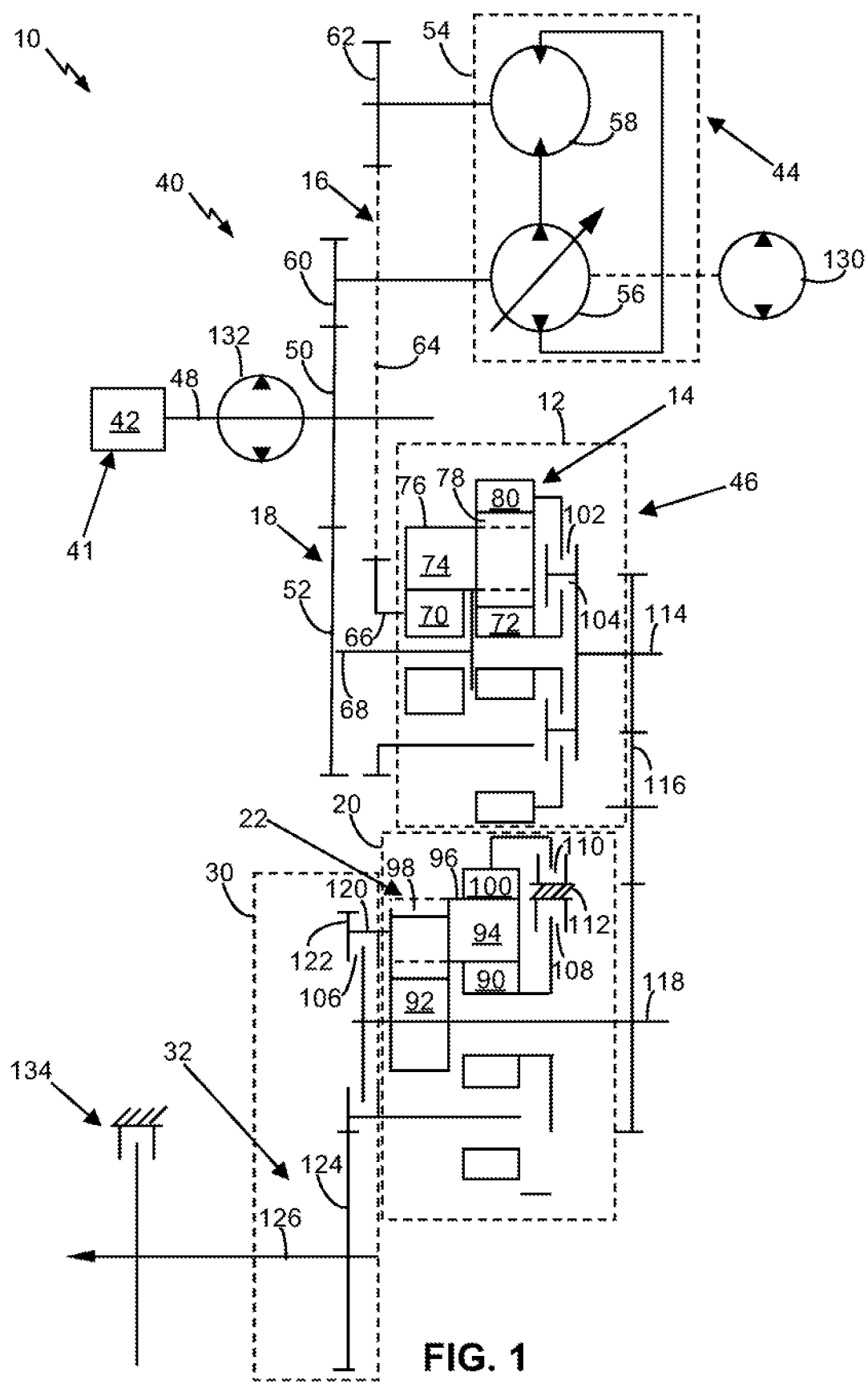
FIGS. 1-3 illustrate schematic views of example continuously variable transmissions.

FIG. 1 illustrates a schematic view of an example continuously variable transmission (CVT) 10 incorporating aspects of the present disclosure. While a specific implementation of a CVT 10 is described herein, the CVT 10 may be of any type having appropriate components for performance of the techniques described herein.

In some implementations, the CVT 10 may include a plurality of modules that may be coupled together in various output configurations for application to a plurality of machine applications. For ease of understanding, broken lines are provided about the respective modules. A first, differential module 12 may include at least one first planetary gear arrangement 14 with a plurality of gears. A second, range module 20 may include a second planetary gear arrangement 22 with a plurality of gears. The differential module 12 may determine the torque/speed reduction from an input that combines a first power source path 16 and a second power source path 18, and the range module 20 may determine the direction of motion transmitted by the CVT 10 (e.g., whether the CVT 10 is operating in a forward, reverse, or auxiliary mode). A third, drop box module 30 may include an output gearing arrangement 32, and may adapt the output of the differential module 12 and the range module 20 to a final output member 126 for specific machine configurations.

The illustrated CVT 10 may include a hydromechanical transmission 40, which may be driven by a primary driver 41, such as an engine 42. The engine 42 may include, for example, an internal combustion engine or another kind of device capable of powering the CVT 10. The engine 42 may provide output to both a hydrostatic transmission 44 and a mechanical transmission 46 via an input member 48. The input member 48 may provide split power to the hydrostatic transmission 44 (e.g., via an input gear 50 and a hydrostatic transmission input gear 60) and the first planetary gear arrangement 14 of the mechanical transmission 46 (e.g., via the input gear 50 and a mechanical transmission input gear 52). In some implementations, the input gear 50 may be fixed (e.g., to the input member 48). As used herein, the term "fixed" may mean being integral with, permanently attached, pinned, interconnected through a splined connection, or fused by welding, for example, or by any other means known to those having ordinary skill in the art.

The hydrostatic transmission 44 may include a variator 54 that includes a variable displacement pump 56 and a motor 58, which is operated by the variable displacement pump 56. The variable displacement pump 56 may be drivingly connected to the engine 42 via a hydrostatic transmission input gear 60 engaged with the input gear 50. The motor 58 may be a variable displacement motor or a fixed displacement motor. The motor 58 may provide output to the first planetary gear arrangement 14. For example, such output may be provided from the motor 58 to a hydrostatic transmission output gear 62, which may be engaged with a planetary input member 64. The output may be transferred from the planetary input member 64 to the first planetary gear arrangement 14 via a first connection member 66. The first connection member 66 may include one or more shafts and/or gears.

Thus, the variable displacement pump 56 may use the split input power from the engine 42 to fluidly drive the motor 58 to convert the input power from the engine 42 to hydrostatic output power over a continuously variable speed ratio. In this case, power may be provided from the engine 42 to the first planetary gear arrangement 14 along a first power source path 16 that includes the variator 54. In some implementations, the first power source path 16 may include the input member 48, the input gear 50, the hydrostatic transmission input gear 60, the variator 54, the hydrostatic transmission output gear 62, the planetary input member 64, and/or the first connection member 66.

Power may also be provided from the engine 42 to the first planetary gear arrangement 14 along a second power source path 18 that does not include the variator 54. In some implementations, the second power source path 18 may be a mechanical power source path, and/or may include the input member 48, the input gear 50, the mechanical transmission input gear 52, and/or a second connection member 68. The second connection member 68 may include one or more shafts and/or gears. For example, the mechanical transmission input gear 52 may be coupled to the input gear 50, which may be coupled and/or fixed to the input member 48. The mechanical transmission input gear 52 may engage connection member 68, which may provide input to the first planetary gear arrangement 14. Although particular first and second power source paths 16, 18 have been illustrated, the first and second power source paths 16, 18 may be other than as illustrated, and may be dependent upon the machine that includes the CVT 10.

In some implementations, the first planetary gear arrangement 14 may be a Ravigneaux planetary gear set. For example, the first planetary gear arrangement 14 may include two sun gears 70, 72, a planet carrier 74 that holds first and second planetary gear sets 76, 78 (e.g., a set of inner planets and a set of outer planets), and a ring gear 80. The first planetary gear arrangement 14 may combine the hydrostatic output power from the first power source path 16 with the split input mechanical power from the second power source path 18 to provide hydromechanical output power to the range module 20. In some implementations, the first planetary gear arrangement 14 provides a configurable selection of planetary outputs to provide a desired speed to the range module 20.

Similarly, the second planetary gear arrangement 22 may be a Ravigneaux planetary gear set. For example, the second planetary gear arrangement 22 may include two sun gears 90, 92, a planet carrier 94 that holds first and second planetary gear sets 96, 98 (e.g., a set of inner planets and a set of outer planets), and a ring gear 100. While the first and second planetary gear arrangements 14, 22 have been illustrated in a particular configuration, other configurations are possible.

As shown, the first power source path 16 and the second power source path 18 may enter the differential module 12 from the same end (i.e., the same side). For example, and as shown, the first power source path 16 and the second power source path may provide power to the differential module 12 (e.g., via the first connection member 66 and the second connection member 68, respectively) from an end of the differential module 12 that is closest to the engine 42. Thus, the first connection member 66 and the second connection member 68 need not bypass the ring gear 80 to provide power to the first planetary gear arrangement 14.

In other words, the first power source path 16 and the second power source path 18 may provide power to the differential module 12 (e.g., to the sun gear 70 and the planet carrier 74, respectively) from a same direction relative to the differential module 12. In this case, the first connection member 66 and the second connection member 68 may enter the differential module 12 from a same direction. Additionally, or alternatively, the first power source path 16 and the second power source path 18 may provide power to the differential module 12 without passing through the range module 20. Thus, the first connection member 66 and the second connection member 68 need not pass through the range module 20 to provide power to the differential module 12.

In some implementations, variable rotational power, provided from the differential module 12 to the range module 20, may be provided along multiple shafts or multiple directions from the differential module 12 to the range module 20 (e.g., to the sun gear 92 of the second planetary gear arrangement 22). For example, the variable rotational power may be output from the differential module 12 via a differential module output member 114, and may be transferred via one or more gears of a transfer gear set 116 coupled to the differential module output member 114. The variable rotational power may be transferred from the transfer gear set 116 to a range module input member 118 coupled to one or more gears of the transfer gear set 116. The range module input member 118 may be coupled to one or more gears of the second planetary gear arrangement 22, such as the sun gear 92. The differential module output member 114, the transfer gear set 116, and/or the range module input member 118 may include one or more shafts, one or more gears, and/or the like. In some implementations, the differential module output member 114 and the range module input member 118 may be parallel to one another, as shown.

The CVT 10 may include a plurality of selectively engageable clutch assemblies 102, 104, 106, 108, 110. As used herein, selectively engageable means that the clutch assembly may be engaged or disengaged, depending upon a selected mode of operation. At least one of the clutch assemblies is disposed to selectively engage at least one gear of the first planetary gear arrangement 14 with at least one gear of the second planetary gear arrangement 22. At least another one of the clutch assemblies is selectively engageable with at least one gear of the second planetary gear arrangement 22.

In some implementations, the clutch assemblies 102, 104, 106 may include respective rotatable discs that may be selectively coupled to other rotatably mounted discs to transmit power from one rotatable member to another. In contrast, clutch assemblies 108, 110 may include respective rotatable discs that may be selectively coupled to a stationary member 112, such as a housing. Accordingly, clutch assemblies 108, 110 may be referred to as stationary clutch assemblies, also known as brakes, which hold the speed of a coupled gear (ring gear 100 and planet carrier 94, respectively) to zero, thereby affecting the speed and/or direction of the output from the second planetary gear arrangement 22.

In some implementations, at least one first clutch assembly 102 and/or 104 may be selectively engaged to couple the first planetary gear arrangement 14 with the second planetary gear arrangement 22. In this way, the engagement of at least one gear of the first planetary gear arrangement 14 with at least one gear of the second planetary gear arrangement 22 determines the torque/speed reduction from an input that combines first and second power source paths 16, 18. In this implementation, engagement of clutch assembly 102 provides a low gear range, while engagement of clutch assembly 104 provides a high gear range.

Similarly, at least one second clutch assembly 108 and/or 110 may be selectively engaged to couple with the second planetary gear arrangement 22 to determine the direction of power output from the range module 20 to the drop box module 30. In the illustrated implementation, the clutch assemblies 108, 110 are stationary clutches or brakes. In this implementation, engagement of the clutch assembly 108 provides a forward gear range, while engagement of the clutch assembly 110 provides a reverse gear range. Conversely, a second clutch assembly 106 may be selectively engaged to couple respective gears of the second planetary gear arrangement 22 with first planetary gear arrangement 14. In the illustrated implementation, such engagement of clutch assembly 106 provides an auxiliary gear range. Likewise, in accordance with this disclosure, engagement of different clutch assemblies of the CVT 10 may be adapted to provide a variety of ranges.

While the clutch assemblies have been illustrated in a particular configuration, other configurations are possible, including a greater or lesser number of clutches, different positioning, and with coupling to different gears, so long as the clutch assemblies may be engaged and/or disengaged in order to provide a selection of ranges. Moreover, one or more of the clutch assemblies 102, 104, 106, 108, 110 may be part of the range module 20 or the differential module 12. For example, clutch assemblies 102, 104 may be packaged with the first planetary gear arrangement 14, clutch assemblies 106, 110 may be packaged with the second planetary gear arrangement 22, and clutch assembly 108 may be disposed separate from the remaining clutch assemblies 102, 104, 106, 110.

In some implementations, the clutch assemblies 102, 104, 106, 108, 110 may be selectively engaged or disengaged to provide a desired range to an output member 120 of the second planetary gear arrangement 22 to the drop box module 30. In this configuration, the output member 120 may be coupled for rotation with planet carrier 94, although the output member 120 may be coupled differently in other configurations. The drop box module 30 may include an output gearing arrangement 32, which may be designed to adapt the output provided by the output member 120 to a particular application. In the illustrated implementation, the output member 120 provides rotation to a first output gear 122 engagingly coupled to a final output gear 124 to provide rotation to a final output member 126 (e.g., to an axle of a machine, an implement of the machine, and/or the like). However, the drop box module 30 may be alternatively designed to facilitate adaptation of the output of the range module 20 for specific applications. For example, fewer or additional structures may be provided, and/or the sizes, configurations, gear ratios, and/or number of output gears may be varied.

In the illustrated implementation, the input member 48, the first connection member 66, and the second connection member 68 are positioned parallel to the planetary gear arrangements 14, 22, the output member 120, and the final output member 126. One or more of these components, as well as other components, may be supported within a transmission housing and may rotate about bearings held within the housing.

While the drop box module 30 is illustrated in a particular configuration, the positions, engagements, and components of the drop box module 30, as well as the position and arrangement of the final output member 126 to a machine, may be other than as illustrated, and may be dependent upon the machine in which the CVT is included.

In some implementations, the CVT 10 may include one or more auxiliary pump drives 130 and/or 132. For example, the CVT 10 may include an auxiliary pump drive 130 coupleable to the variator 54 (e.g., the variable displacement pump 56 of the variator 54). Additionally, or alternatively, the CVT 10 may include an auxiliary pump drive 132 coupleable to the input member 48. Additionally, or alternatively, the CVT 10 may include a parking brake 134 (e.g., a ground-driven auxiliary pump drive) coupleable to the final output member 126. The auxiliary pump drives 130 and/or 132 may include any type of pump, such as a scavenge pump, a lube pump, a control pump, a charge pump, a steering pump, a drive pump (e.g., an all-wheel drive pump), and/or the like. In some implementations, the CVT 10 may be included in a machine, such as a motor grader, a wheel loader, and/or the like.

As indicated above, FIG. 1 is provided as an example. Other examples are possible and may differ from what was described with regard to FIG. 1. For example, the CVT 10 may include additional components, fewer components, different components, or differently arranged components than those shown in FIG. 1.

Figure 2:
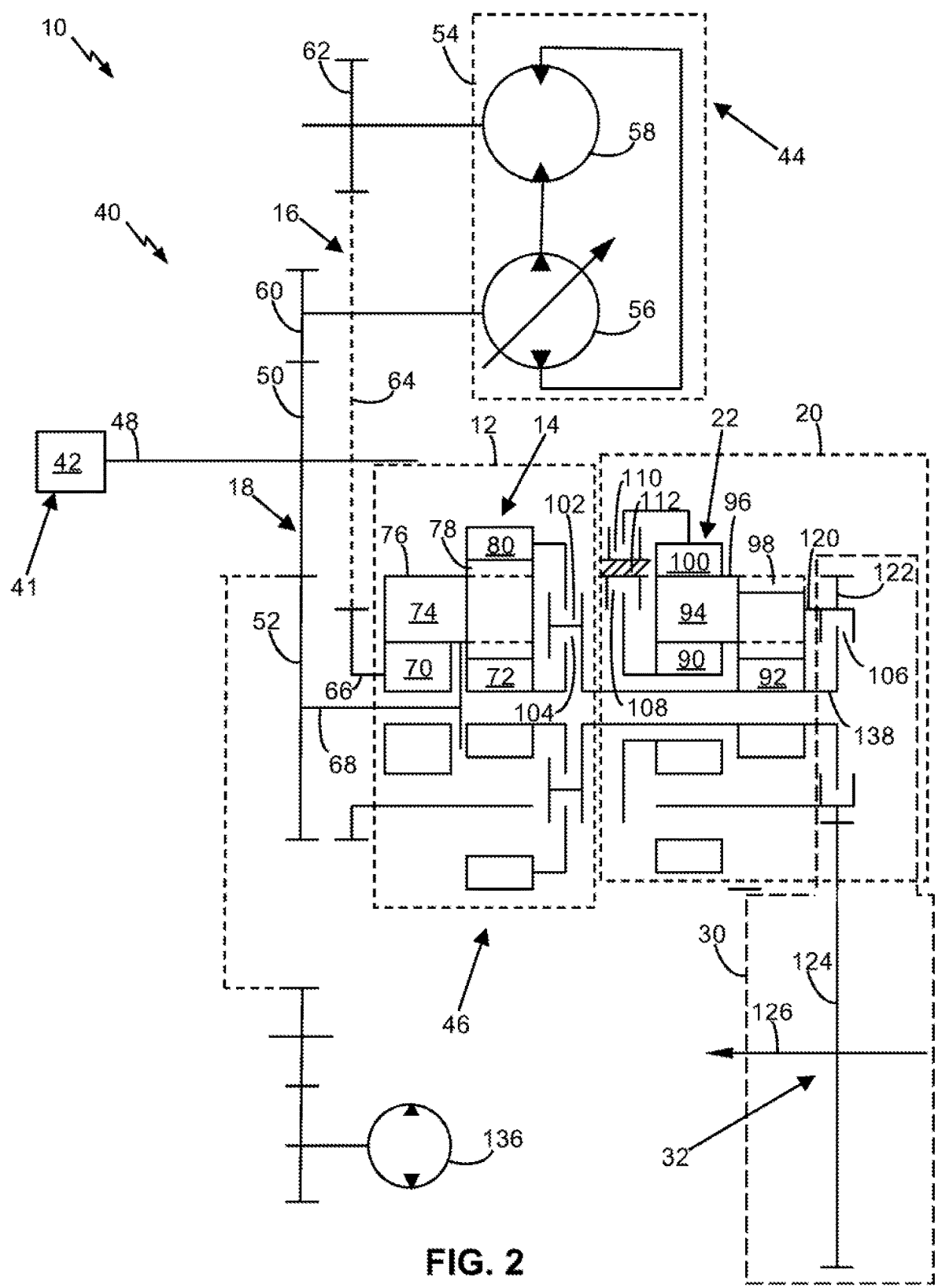

FIG. 2 illustrates a schematic view of another example CVT 10 incorporating aspects of the present disclosure.

As shown in FIG. 2, in some implementations, the CVT 10 may include an auxiliary pump drive 136 coupleable to the second power source path 18 (e.g., the input gear 50, the mechanical transmission input gear 52, and/or the like). The auxiliary pump drive 136 may include any type of pump, such as a scavenge pump, a lube pump, a control pump, a charge pump, a steering pump, a drive pump (e.g., an all-wheel drive pump), and/or the like.

As further shown in FIG. 2, in some implementations, the variable rotational power, provided from the differential module 12 to the range module 20, is to be provided along a single shaft or a single direction from the differential module 12 to the range module 20 (e.g., to the sun gear 92). For example, the differential module output member 114 and the range module input member 118 of FIG. 1 may be a single input/output member 138 coupled to an output from the first planetary gear arrangement 14 and an input to the second planetary gear arrangement 22. In this case, the input/output member 138 may perform functions of both the differential module output member 114 and the range module input member 118. In this arrangement, the range module 20 may be positioned at an opposite end of the differential module 12 from the end via which power is provided to the differential module 12 via the first power source path 16 and the second power source path 18, whereas in the arrangement of FIG. 1, the range module 20 is not positioned at an opposite end of the differential module 12 from the end via which the power is provided to the differential module 12.

In some implementations, the variable rotational power may be provided to the range module 20 (e.g., the sun gear 92 of the second planetary gear arrangement 22) after bypassing the ring gear 100 of the second planetary gear arrangement 22, as shown in FIG. 2, in contrast to the configuration shown in FIG. 3 and described below. In this configuration, the input/output member 138 may bypass the ring gear 100 and/or one or more other gears of the second planetary gear arrangement 22 (e.g., the sun gear 90, the planet carrier 94, the first planetary gear set 96, the second planetary gear set 98, and/or the like) before coupling with the sun gear 92.

As indicated above, FIG. 2 is provided as an example. Other examples are possible and may differ from what was described with regard to FIG. 2. For example, the CVT 10 of FIG. 2 may include a parking brake 134 and/or other components shown in FIG. 1 and/or FIG. 3.

Figure 3:
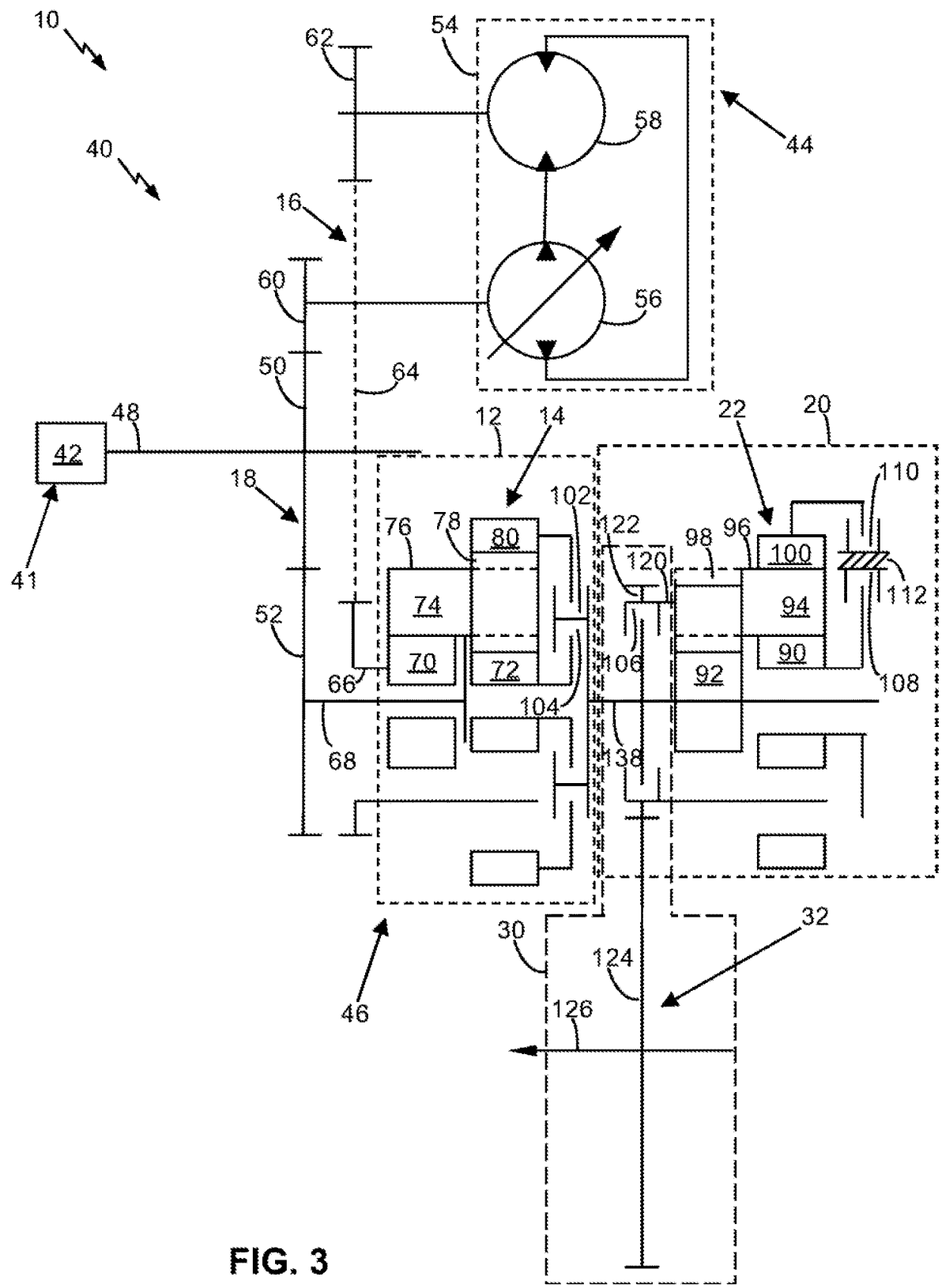

FIG. 3 illustrates a schematic view of another example CVT 10 incorporating aspects of the present disclosure.

As shown in FIG. 3, in some implementations, the variable rotational power may be provided to the range module 20 (e.g., the sun gear 92 of the second planetary gear arrangement 22) without bypassing the ring gear 100 of the second planetary gear arrangement 22. In this configuration, the input/output member 138 may couple with the sun gear 92 without bypassing the ring gear 100 and/or one or more other gears of the second planetary gear arrangement 22 (e.g., the sun gear 90, the planet carrier 94, the first planetary gear set 96, the second planetary gear set 98, and/or the like).

As indicated above, FIG. 3 is provided as an example. Other examples are possible and may differ from what was described with regard to FIG. 3. For example, the CVT 10 of FIG. 3 may include a parking brake 134 and/or other components shown in FIG. 2 and/or FIG. 3.

INDUSTRIAL APPLICABILITY

During operation of the CVT 10, power may be delivered from the primary driver 41 to the first planetary gear arrangement 14 of the differential module 12 via the first and second power source paths 16, 18. More specifically, rotation of the input member 48 may provide power via the input gear 50 and the hydrostatic transmission input gear 60 to the variator 54. The variator 54 may provide power via the hydrostatic transmission output gear 62 to the planetary input member 64, which may be fixedly connected to the first connection member 66, which may be coupled to the sun gear 70 of the first planetary gear arrangement 14. Rotation of the input member 48 by the primary driver 41 may provide power via the input gear 50 to the mechanical transmission input gear 52, which may be fixedly connected to the second connection member 68, which may be coupled to the planet carrier 74 of the first planetary gear arrangement 14.

Power from the differential module 12 may be transmitted to the second planetary gear arrangement 22 of the range module 20 based upon selective engagement or disengagement of the clutch assemblies 102, 104, 106, 108, 110 to provide varied ranges. More specifically, in the illustrated implementation, the clutch assemblies 102, 104, 106, 108, 110 may be selectively engaged and disengaged to provide a low-forward range, a high-forward range, a low-reverse range, a high-reverse range, and an auxiliary range. In this implementation, engagement of clutch assembly 102 provides for low range operation, while engagement of clutch assembly 104 provides for high range operation. The low and high range operation may be coupled with designation of a forward or reverse range by engagement of clutch assemblies 108 or 110, respectively. Finally, an auxiliary range may be provided by engagement of clutch assemblies 104 and 106.

For example, to provide a low-forward range, clutch assemblies 102 and 108 may be engaged. Accordingly, rotation of the ring gear 80 of the first planetary gear arrangement 14 is transmitted via clutch assembly 102 to the sun gear 92. With the engagement of clutch assembly 108, the sun gear 90 is held stationary. Power is further transmitted through the second planetary gear arrangement 22 to be output via planet carrier 94 to output member 120, from which power is transmitted via the drop box module 30 to the final output member 126. Because of the engagement of clutch assembly 108, this low range operation is provided in the forward direction. However, in an operation where clutch assemblies 102 and 110 are engaged, the ring gear 100 is held stationary. As a result, the low range output to the output member 120 is provided in a reverse direction.

Similarly, to provide a high-forward range, clutch assemblies 104 and 108 may be engaged. Accordingly, rotation of the sun gear 72 of the first planetary gear arrangement 14 is transmitted via clutch assembly 104 to the sun gear 92. As explained above, with the engagement of clutch assembly 108, the sun gear 90 of the second planetary gear arrangement 22 is held stationary. Power is further transmitted via the second planetary gear arrangement 22 to be output via the planet carrier 94 to the output member 120, from which power is transmitted via the drop box module 30 to the final output member 126. Because of the engagement of clutch assembly 108, this high range operation is provided in the reverse direction. However, in an operation where clutch assemblies 104 and 110 are engaged, the ring gear 100 is held stationary. As a result, the high range output to the output member 120 is provided in a reverse direction.

Additionally, or alternatively, the range module 20 may provide an auxiliary range to the output member 120. In the auxiliary range, clutch assemblies 104 and 106 may be engaged. As a result, power from the differential module 12 is transmitted via the sun gear 72 to the sun gear 92. Because of the engagement of clutch assembly 106, however, this rotation is transmitted to planet carrier 94, and is output via output member 120 to the drop box module 30, which transmits rotation to the final output member 126.

The disclosed CVT 10 may provide more compact packaging than other CVTs, thereby allowing the CVT 10 to be packaged in smaller machines or locations with space limitations, such as a motor grader, a wheel loader, and/or the like. For example, the CVT configurations of FIGS. 1-3 may permit the use of shorter shafts (e.g., drive shafts, idler shafts, and/or the like), such as a shorter input member 48, a shorter first connection member 66, a shorter second connection member 68, and/or the like, as compared to other CVT configurations. This may reduce the length and/or width of the CVT 10, making the CVT 10 suitable for machines with tighter space and/or design constraints, such as a small departure angle. For example, the CVT shown in FIG. 1 may be suitable for machines that require a shorter package and permit a wider package, whereas the CVTs shown in FIGS. 2 and 3 may be suitable for machines that require a narrower package and permit a longer package. Furthermore, by reducing a length of one or more shafts of the CVT 10, a cost of the CVT 10 may be reduced, a weight of the CVT 10 may be reduced, a complexity of the CVT 10 may be reduced, and/or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents.

What is claimed is:

1. A transmission comprising:
   a differential module that includes a first planetary gear arrangement having a first plurality of gears including a sun gear and a carrier,
      the first planetary gear arrangement being a Ravigneaux planetary gear set;
   a first power source path to provide power to the sun gear;
   a second power source path to provide power to the carrier via a connection member,
      the connection member being directly connected to the carrier, and
      the power from the first power source path and the power from the second power source path to be provided via a same end of the differential module;
   a range module that includes a second planetary gear arrangement having a second plurality of gears;
   a plurality of selectively engageable clutch assemblies that are selectively engageable to provide a plurality of directional ranges,
      at least one clutch assembly, of the plurality of selectively engageable clutch assemblies, being selectively engageable to couple at least one gear from the first planetary gear arrangement with at least one gear from the second planetary gear arrangement; and
   a drop box module that includes a final output member,
      the differential module being coupleable to the range module to provide a variable rotational power to the range module,
      the range module being coupleable to the drop box module to direct the variable rotational power in a selected direction,
      the variable rotational power, provided in the selected direction, to be transmitted through the drop box module to the final output member.

2. The transmission of claim 1, wherein the power from the first power source path and the power from the second power source path are to be provided to the differential module without passing through the range module.

3. The transmission of claim 1, wherein the variable rotational power is to be provided along a single shaft or a single direction from the differential module to a sun gear of the second plurality of gears of the second planetary gear arrangement of the range module.

4. The transmission of claim 3, wherein the variable rotational power is to be provided to the sun gear of the second plurality of gears of the second planetary gear arrangement after bypassing a ring gear of the second plurality of gears of the second planetary gear arrangement.

5. The transmission of claim 3, wherein the variable rotational power is to be provided to the sun gear of the second plurality of gears of the second planetary gear arrangement without bypassing a ring gear of the second plurality of gears of the second planetary gear arrangement.

6. The transmission of claim 1, wherein the variable rotational power is to be provided along multiple shafts or multiple directions from the differential module to a sun gear of the second plurality of gears of the second planetary gear arrangement of the range module.

7. The transmission of claim 1, wherein the range module is positioned at an opposite end of the differential module from the end via which the power from the first power source path and the power from the second power source path is to be provided to the differential module.

8. The transmission of claim 1, wherein the range module is not positioned at an opposite end of the differential module from the end via which the power from the first power source path and the power from the second power source path is to be provided to the differential module.

9. The transmission of claim 1, further comprising at least one of:
an auxiliary pump drive coupleable to a variator of the first power source path,
an auxiliary pump drive coupleable to the second power source path,
a parking brake coupleable to the final output member, or some combination thereof.

10. A transmission, comprising:
a differential module that includes a first planetary gear arrangement that includes a first sun gear, a second sun gear, a first set of planet gears, a second set of planet gears, a first planet carrier, and a first ring gear,
the first planetary gear arrangement being a Ravigneaux planetary gear set;
a range module that includes a second planetary gear arrangement that includes a third sun gear, a fourth sun gear, a third set of planet gears, a fourth set of planet gears, a second planet carrier, and a second ring gear;
a first power source path that includes a variator;
a second power source path that includes at least one mechanical gear,
the first power source path and the second power source path to provide power to the differential module without passing through the range module,
the second power source path to provide power to the first planet carrier via a connection member, and
the connection member being directly connected to the first planet carrier;
a plurality of clutch assemblies including at least a first clutch assembly and a second clutch assembly,
the first clutch assembly being selectively engageable to couple at least one gear of the first planetary gear arrangement and at least one gear of the second planetary gear arrangement,
the second clutch assembly being selectively engageable to couple with at least one gear of the second planetary gear arrangement; and
a drop box module that includes a final output member,
the differential module being coupleable to the range module to provide a variable rotational power to the range module,
the range module being coupleable to the drop box module to direct the variable rotational power in a selected range,
the variable rotational power, in the selected range, to be transmitted through the drop box module to the final output member.

11. The transmission of claim 10, wherein the first power source path and the second power source path are to provide power to the differential module via a same end of the differential module.

12. The transmission of claim 10, wherein the variable rotational power is to be provided along a single shaft or a single direction from the differential module to the range module.

13. The transmission of claim 12, wherein the variable rotational power is to be provided to the third sun gear or the fourth sun gear after bypassing the second ring gear.

14. The transmission of claim 12, wherein the variable rotational power is to be provided to the third sun gear or the fourth sun gear without bypassing the second ring gear.

15. The transmission of claim 10, wherein the variable rotational power is to be provided along multiple shafts or multiple directions from the differential module to the range module.

16. The transmission of claim 10, further comprising at least one of:
an auxiliary pump drive coupleable to the variator,
an auxiliary pump drive coupleable to the second power source path, or
a parking brake coupleable to the final output member.

17. A machine that includes a transmission, the transmission comprising:
a first power source path that includes a variator;
a second power source path that includes at least one mechanical gear;
a differential module that includes a first planetary gear arrangement having a first plurality of gears including a sun gear and a carrier,
the first planetary gear arrangement being a Ravigneaux planetary gear set,
the first power source path to provide power to the sun gear,
the second power source path to provide power to the carrier via a connection member,
the connection member being directly connected to the first planet carrier, and
the power to the sun gear and the power to the carrier to be provided from a same direction relative to the differential module;
a range module that includes a second planetary gear arrangement having a second plurality of gears;
a plurality of selectively engageable clutch assemblies that are selectively engageable to provide a plurality of directional ranges,
at least a first clutch assembly, of the plurality of selectively engageable clutch assemblies, being selectively engageable to couple at least one gear from the first planetary gear arrangement with at least one gear from the second planetary gear arrangement, at least a second clutch assembly, of the plurality of selectively engageable clutch assemblies, being selectively engageable to couple with at least one gear from the second planetary gear arrangement; and a drop box module that includes a final output member,
the differential module being coupleable to the range module to provide a variable rotational power to the range module,
the range module being coupleable to the drop box module to direct the variable rotational power in a selected direction,
the variable rotational power, provided in the selected direction, to be transmitted through the drop box module to the final output member.

18. The machine of claim 17, wherein the first power source path and the second power source path are to provide power to the differential module via a same end of the differential module without passing through the range module.

19. The machine of claim 17, wherein the machine is a motor grader.

20. The machine of claim 17, wherein the machine is a wheel loader.

\* \* \* \* \*